Jan. 24, 1956 L. A. HULTEEN ET AL 2,732,466
TORSIONAL SPRING
Filed July 13, 1953 3 Sheets-Sheet 1

INVENTOR.
Leonard A. Hulteen
Walter Kowalski
BY
Lee H. Kaiser
Attorney

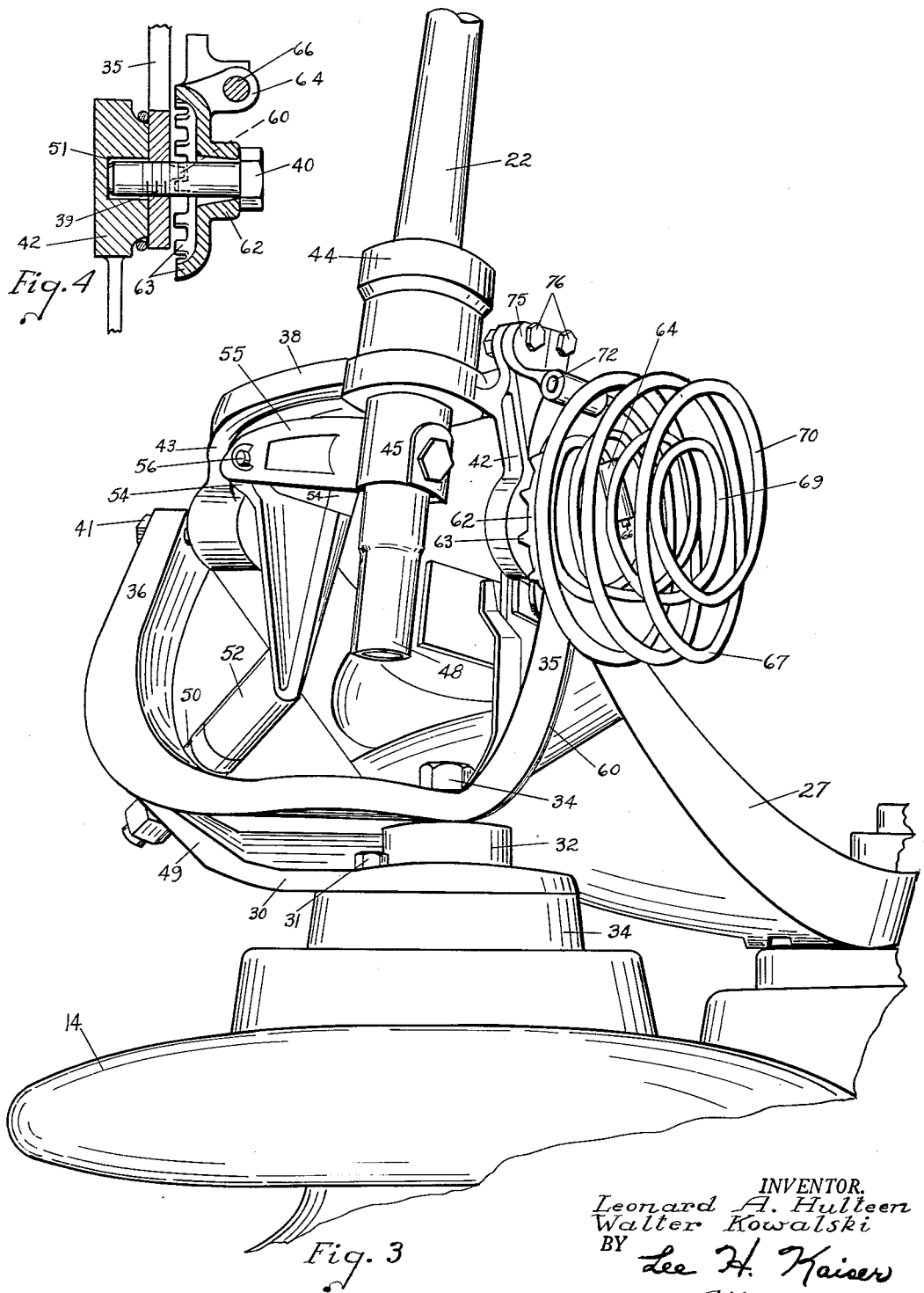

United States Patent Office 2,732,466
Patented Jan. 24, 1956

2,732,466

TORSIONAL SPRING

Leonard A. Hulteen and Walter Kowalski, Milwaukee, Wis., assignors to McGraw Electric Company, Milwaukee, Wis., a corporation of Delaware Application July 13, 1953, Serial No. 367,630

8 Claims. (Cl. 200—166)

This invention relates to springs and in particular to torsional spring means for producing a torque between two relatively movable members.

It is an object of the invention to provide compact, yet powerful, means for producing a torque in either a clockwise or a counterclockwise direction between two members which are rotatable relative to each other.

Although the invention has universal application, the preferred embodiment is ideally suited to counterbalance the weight of the switch blade of a high-voltage, air break switch, and the invention is illustrated and described in this connection. The effort necessary to operate such an air break switch is due to friction and the weight of the switch blade, and in large switches, especially those remotely controlled, it is desirable that all friction other than that produced by the rubbing motion in contacting the stationary contacts be reduced to a minimum and the weight of the blade counterbalanced. Compression or torsional springs are conventionally used to counterbalance the blade and thus facilitate movement from connect to disconnect position. Such springs are loaded when the switch is closed and urge the blade to open, or disconnect, position. Under severe climatic conditions conventional counterbalancing springs often become so solidly encased in ice that they no longer exert force tending to restore the blade to disconnect position.

It is an object of the preferred embodiment of the invention to provide unique torsion spring means for counterbalancing the switch blade of an electrical switch.

A further object is to provide such torsion spring counterbalancing means which, even under extreme conditions of icing, is adapted to break the ice formed thereon and which cannot be iced so that it no longer exerts restoring torque on the switch blade.

Still another object of the invention is to provide such counterbalancing means which can be readily adjusted in torque.

A still further object is to provide means for counterbalancing the switch blade of an electrical switch so as to obtain smooth, balanced, and efficient operation.

In accordance with the invention, a torsion spring is wound in an inner helix and an outer helix concentric with and of greater diameter than the inner helix with both extremities terminating at the same end of the spring and adapted to be connected to the relatively movable members.

The above and other objects, features, and advantages of the present invention will be fully understood from the following description considered in connection with the accompanying illustrative drawing in which:

Fig. 3 is a perspective view of the switch taken from the left relative to Fig. 2 showing the blade in disconnect position; and Fig. 4 is a horizontal sectional view taken on line 4—4 of Fig. 2.

Figure 1:
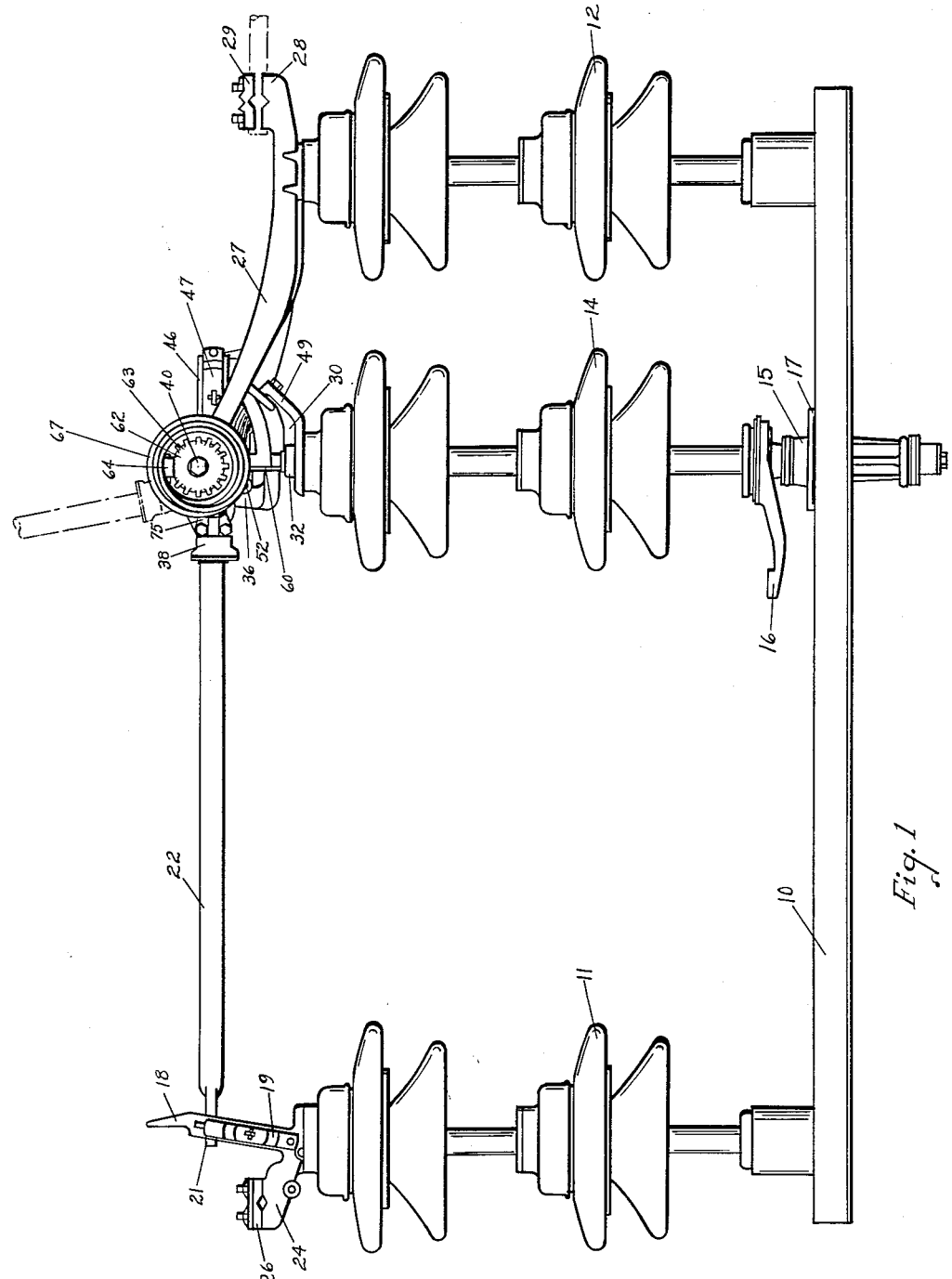
Fig. 1 is a view in side elevation illustrating an air break switch with the preferred embodiment of means for counterbalancing the switch blade.

Referring now to the drawing in detail, the preferred embodiment of the invention is illustrated in Fig. 1 as included in a rotating insulator, high-voltage, air break switch mounted on a horizontal channel 10 which supports spaced apart, vertical stationary insulators 11 and 12 and a rotatable insulator 14 in alignment with and disposed between the insulators 11 and 12. The rotatable insulator 14 is mounted on a bearing 15 rotatable about a vertical axis under the action of a lever 16 and supported upon the channel 10 by a bearing mounting 17. The insulators 11, 12, and 14 are of conventional construction and are illustrated as of the pin type. The insulator 11 at its upper end carries a stationary contact assembly comprising U-shaped contacts 18, resiliently reinforced by floating backup springs 19 for receiving the flattened contact portion 21 of the switch blade 22 in high pressure contact engagement therewith. The stationary contact assembly carries a terminal pad 24 to which a terminal connector 26 may be secured.

The mechanism for actuating the switch blade 22 rotatably about its axis and through an arcuate path between closed and open position is disclosed in the application of Thorsten A. Fjellstedt, Serial No. 449,129, entitled Disconnecting Switch, and having the same assignee as the subject invention. The blade-actuating mechanism does not constitute a part of the present invention and the above application may be consulted for details of structure and operation. Although for the purpose of describing the present invention it would suffice merely to point out that rotation of the rotatable insulator 14 pivots the switch blade 22 through an arcuate path to its opening and closing positions, the mechanism for actuating the switch blade 22 will hereinafter be briefly described.

At its upper end the stationary insulator 12 carries one end of a blade mechanism support 27, which may be a bronze casting, having a terminal pad 28 provided with a terminal connector 29 for the attachment of the line conductor. A crank 30 is affixed to the upper end of the rotating insulator 14 by stud bolts 31. The crank 30 has a circular portion 32 which is bored to provide a cylindrical compartment (not shown) having its axis coincident with the axis of the insulator 14. The cylindrical compartment accommodates a ball bearing (not shown) rigidly secured to the free end at the blade mechanism support 27 by a bolt 34 to thus journal the upper end of the rotating insulator 14. Integral with the blade mechanism support 27 are two arms 35 and 36 forming a U-shaped cradle for pivoting a blade guide 38. The two arms 35 and 36 receive pintles 40 and 41 so as to pivot the blade guide 38 about a horizontal axis. External threads 39 intermediate the ends of the pintles 40 and 41 engage internally threaded, horizontal apertures in the arms 35 and 36 (see Fig. 4). The blade guide 38 includes a U-shaped stirrup portion having arms 42 and 43 provided with horizontal bores to accommodate the unthreaded ends of the pintles 40 and 41 respectively. The blade guide 38 also has a tubular journal portion 44 having its axis normal to the axis of pintles 40—41 and in which a generally tubular blade carriage 45 is mounted for rotation about its axis. During operation of the switch the common axis of the tubular journal portion 44 and the tubular blade carriage 45 swings in a vertical plane perpendicular to the horizontal axis formed by the pintles 40 and 41 and about which the blade guide 38 pivots. The switch blade 22 is rigidly positioned within the tubular carriage 45 for rotation with the carriage about its axis. The pintles 40 and 41 thus provide a fulcrum for pivoting the switch blade 22 through arcuate connecting and disconnecting motions with respect to the spaced stationary contacts.

Affixed to the blade mechanism support 27 is a stationary contact assembly including U-shaped contacts 46, similar to the contacts 18, disposed in a horizontal plane. The U-shaped contacts 46 are resiliently reinforced by floating backup springs 47, in a manner identical to the backup springs 19, and adapted to receive the flattened end 48 of the switch blade 22 in high pressure contact engagement.

The crank 30 affixed to the upper end of the rotatable insulator 14 has a portion 49 extending upwardly at an acute angle to the horizontal and connected through a ball-and-socket 50 to a connecting link 52. The end of the crank 30 describes an arcuate path in a horizontal plane as the insulator 14 rotates. The connecting link 52 terminates at the end opposite the ball-and-socket in a cradle portion formed by arms 54. (See Fig. 3.) The blade carriage 45, which as described above is journalled for rotation about its axis, has a cradle portion formed by arms 55 which are pivotally connected by journal pins 56 to the arms 54 forming the cradle portion of the connecting link 52. It may be considered that the end of the connecting link 52 remote from the ball-and-socket 50 is the actuating point for the rotating and swinging motions of the switch blade 22, and further that the force resulting from rotation of the rotating insulator is a "push" exerted at this actuating point. During rotation of the insulator 14, the actuating point describes a circular path about the axis of the tubular blade carriage 45 at the same time that the blade guide 38, which carries the blade carriage 45, is pivoted about the fixed horizontal axis formed by the pintles 40 and 41. The push exerted at the actuating point has a first component tending to rotate the blade carriage 45 about the axis of the switch blade 22 and a second component acting in a vertical direction and tending to pivot the blade guide 38 about the fulcrum formed by the pintles 40 and 41.

During approximately the first 30° of rotation of the crank 30, the push at the actuating point is exerted principally in a direction at a small acute angle to the horizontal and tending to rotate the blade carriage 45 about the longitudinal axis of the blade 22. During the initial rotation of the crank 30 there is only a slight vertical component tending to pivot the blade guide 38 about the pintles 40 and 41 and thus begin the arcuate movement of the switch blade 22. The vertical component of the push tending to pivot the blade guide 38 about the pintles 40 and 41 increases rapidly as the axis formed by the journal pins 56, which connect the blade carriage 45 and the connecting link 52, approaches the vertical. The movement of the blade carriage 45 relative to the connecting link 52 about the journal pins 56 is almost imperceptible. Further rotation of the crank 30 continues to rotate the blade 22 about its longitudinal axis and transmits motion through the actuating point to pivot the blade guide 38 about the pintles 40 and 41 and thus actuate the switch blade 22 through an arcuate disconnect motion. The disconnect position of the switch blade is shown in dotted lines in Fig. 1 of the drawing.

The switch closing operation takes place in reverse direction from that outlined above. The rotatable insulator 14 is rotated and through the blade-actuating mechanism causes the switch blade 22 to move through an arcuate path to the closed position and to rotate angularly around its own axis incident to its arcuate movement. Substantially all of the high pressure, conact-making rotation movement of the blade is limited to the position where the switch blade is in connect position relative to the stationary contacts with which it is adapted to cooperate.

None of the apparatus hereinbefore described constitutes a part of the present invention which in one preferred form is particularly adapted to counterbalance the weight of the switch blade 22 and to govern its arcuate motion from closed to open position, or vice versa.

The blade mechanism support 27 has an outwardly extending, substantially vertical rib 60 on the arm 35 of the U-shaped cradle. The rib 60 is shown in dotted lines in Fig. 4. The pintle 40 extends through an axial aperture in a circular adjustable guide 62 which is provided with a plurality of peripheral teeth 63 extending parallel to the axis of the pintle 40 at equally spaced intervals around the circumference of the adjustable guide 62. The external threads intermediate the ends of the pintle 40 engage the internal threads in the horizontal bore in the arm 35 to clamp the adjustable guide 62 firmly against the blade mechanism support 27 with the rib 60 positioned between adjacent peripheral teeth 63 of the adjustable guide 62. The adjustable guide 62 is thus releasably held in any of a plurality of angular positions relative to the blade mechanism support 27.

The adjustable guide 62 has an upraised portion 64, extending in a direction opposite to the teeth 63, which is apertured in a direction approximately tangential of the circumference of the guide 62 to snugly receive one extremity 66 of a torsion spring 67 having a plurality of inner helical convolutions 69 and a plurality of outer helical convolutions 70 of larger radius than and surrounding the inner convolutions 69. In the preferred embodiment the torsion spring 67 is illustrated with inner and outer convolutions 69 and 70 respectively wound in opposite directions, but the invention is not so limited. The second extremity 72 of the torsion spring 67 terminates at the same end of the spring as the first extremity 66 and fits snugly within an aperture 73 provided in a transversely extending portion of a fixed guide 75 which is rigidly secured by suitable means such as screws 76 to the blade guide 38.

In the preferred embodiment, the torsion spring 67 is of ⅜ inch diameter phosphor bronze wire with four turns in the inner helix and three turns in the outer helix, but of course the invention is not limited to such material or number of turns. This greater number of smaller diameter convolutions 69 permits the uncoiled length of the inner helix to preferably be approximately equal to the uncoiled length of the outer helix of larger diameter convolutions 70, whereby the moments of the two helices are substantially equal and the spring is self-centering about the axis of the pintles 40. When the torsion spring 67 is formed it is provided with a permanent bend near each extremity to position the two extremities 66 and 72 approximately perpendicular to each other. This configuration is desirable in that it eliminates the need for set screws securing the extremities of the spring 67 to the adjustable guide 62 and the fixed guide 75.

The torsion spring 67 is loaded during assembly to exert a torque tending to rotate the blade guide 38, and thus the switch blade 22, relative to the blade support mechanism 27. It is apparent that the disclosed torsion spring can be loaded to exert a torque in either clockwise or a counterclockwise direction between two relatively movable members. In other words, energy can be stored by either winding or unwinding the spring.

Figure 2:
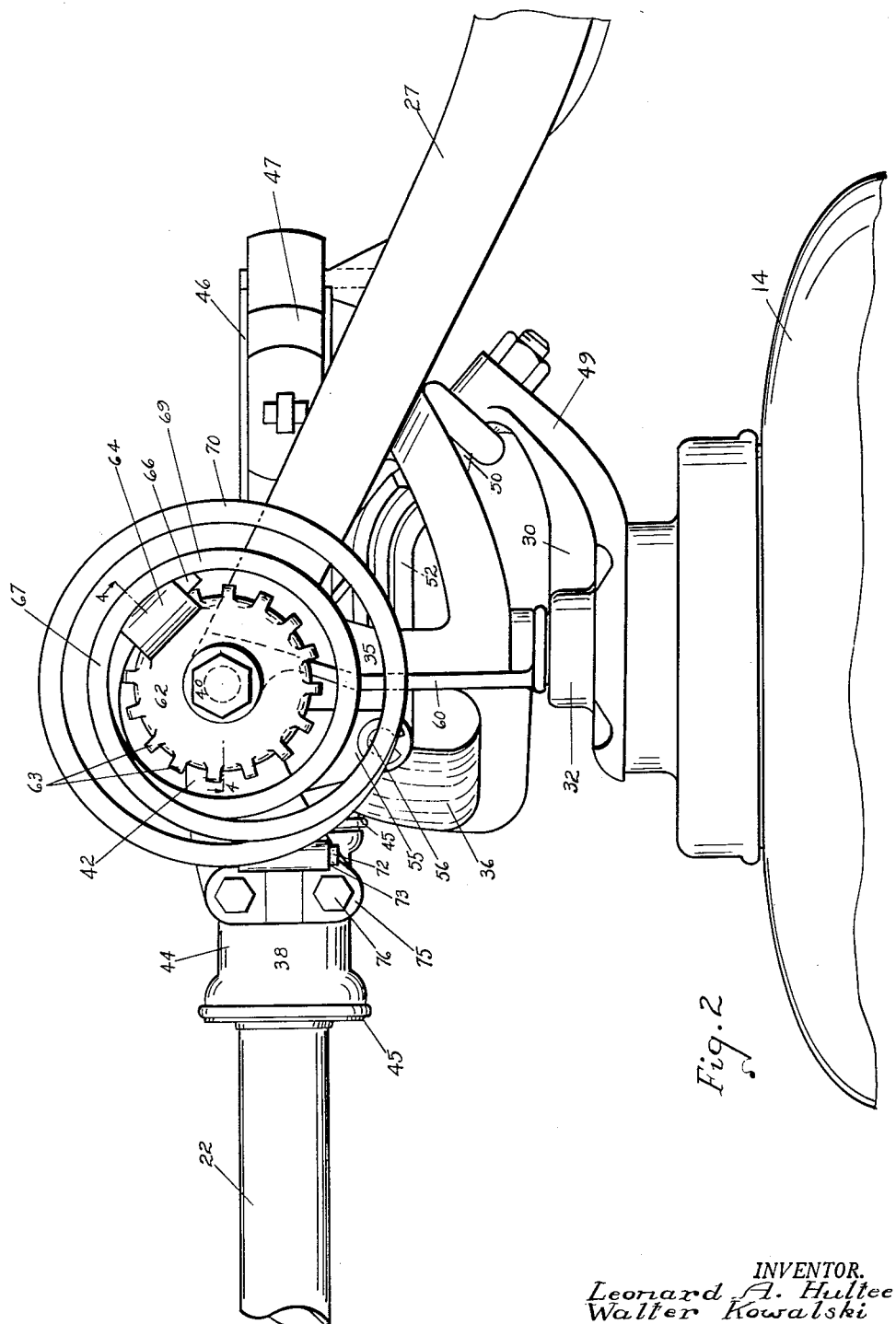
Fig. 2 is an enlarged fragmentary view in side elevation of the portion of the switch of Fig. 1 which includes the preferred embodiment of the invention.

Adjustment of the torque exerted by the torsion spring 67 is accomplished by selectively engaging the peripheral teeth 63 on the adjustable guide 62 with the rib 60 on the blade mechanism support 27. To adjust torque, the pintle 40 is loosened to allow the adjustable guide 62 to be first moved axially and then rotated to obtain the desired loading of the spring 67. Tightening the pintle 40 engages the desired peripheral tooth 63 with the rib 60 of the blade mechanism support 27 and prevents rotation of the adjustable guide 62 relative to the support 27. It will be noted that the adjustable guide 62 is illustrated as adjusted to different angular positions relative to the support 27 in Figs 1 and 2 of the drawing. In Fig. 1 the extremities of the spring 67 are normal to each other, while in Fig. 2 the extremity 66 has been rotated further in a clockwise direction to thus increase the torque tending to rotate the switch blade 22 to disconnect position.

The disclosed invention provides a compact, yet powerful, means of counterbalancing the weight of the switch blade 22. Sufficient torque is exerted by the spring 67 to complete the arcuate disconnect motion of the switch blade 22, after the rotating insulator 14 has been rotated to twist the switch blade 22 about its longitudinal axis sufficiently to disengage it from the stationary contacts. The disclosed counterbalancing spring 67 has the desired property of immediately cracking and loosening, during the initial motion of the rotating insulator 14, any ice accumulated on the spring. It was found impossible to ice the spring 67 sufficiently to prevent it from exerting counterbalancing torque. Even when solidly encased in ice, the torsion spring 67 was found to exert full torque tending to counterbalance the switch blade 22 and to crack and break off the ice upon the slightest rotation of the rotating insulator 14. Change in diameter of the convolutions resulting from only a slight movement of the members under torsion breaks the ice free. The counterbalancing spring 67 provides a smooth and balanced motion of the switch blade 22 in both its opening and its closing operations and also relieves the strain that otherwise would be put on the mechanism due to the shifting weight of the blade in either direction of operation.

It is apparent that the disclosed invention is not limited to use in counterbalancing the blade of an electrical switch, but has universal application in exerting torque in either clockwise or counterclockwise direction between two members which are rotatable relative to each other.

Having thus described our invention, what we claim as new and desire to secure by Letters Patent in the United States is:

1. A counterbalance for a movable electrical switch blade pivoted on a stationary support comprising a torsion spring having a plurality of convolutions forming an inner helix and a plurality of convolutions forming an outer helix of larger radius than and surrounding the inner helix, the spring being a continuous rod having the two extremities thereof terminating at the same end of the spring with one extremity secured to the movable blade and the other extremity affixed to the stationary support.

2. The counterbalance of claim 1 further characterized by adjustable means for selectively changing the torque exerted by said spring between said blade and said support.

3. A counterbalancing spring for attachment to a stationary base and a movable member pivoted on said base, comprising a helically-wound torsion spring having the extremities thereof terminating at the same end of the spring with one extremity adapted for attachment to the pivoted member and the other extremity adapted for attachment to said stationary base, said spring consisting of a plurality of inner helical convolutions surrounded by a plurality of outer helical convolutions concentric with and of larger radius than said inner convolutions.

4. In a device including two members rotatable relative to each other in either of two directions, a torsion spring wound in an inner helix and an outer helix concentric with and of greater radius than said inner helix and wound in the opposite direction therefrom, said inner helix having a greater number of turns than said outer helix, both extremities of said spring terminating at the same end of the spring and each extremity engaging one of said members.

5. In a device including two members rotatable relative to each other in either of two directions, a torsion spring having a plurality of helically-wound inner turns surrounded by a plurality of helically-wound outer turns concentric with and of greater radius and wound in an opposite direction from said inner turns, both extremities of said spring terminating at the same end of the spring and each extremity engaging one of said members.

6. A torsion spring comprising two concentrically related coil sections joined together at one end, the opposite ends of said sections adapted for attachment respectively to relatively rotatable members.

7. In an electrical switch having a movable switch blade pivoted on a stationary support, a counterbalance for the weight of said blade comprising a torsion spring having a plurality of convolutions forming an inner helix and a plurality of convolutions forming an outer helix of larger radius and wound in the opposite direction from said inner helix with the outer convolutions surrounding the inner convolutions and with both extremities terminating at the same end of said spring, one extremity of said spring attached to said pivoted blade, a member rotatable relative to said support about the same axis as said blade and having a plurality of peripherally-spaced teeth, a stop on said support, and means for selectively engaging said teeth with said stop whereby said rotatable member may be adjusted in desired angular relationship relative to said support, the other extremity of said spring attached to said rotatable member.

8. In an electrical switch having a movable switch blade pivoted on a stationary support, means for counterbalancing the weight of said blade comprising a torsion spring having a plurality of convolutions forming an inner helix and a plurality of convolutions forming an outer helix of larger radius than and surrounding the inner helix, the spring being a continuous rod having the two rod ends terminating at the same end of the spring with one rod end secured to said movable blade, an indexing member pivoted to move angularly relative to said support and secured to the other rod end, and means for releasably holding said indexing member in either of a plurality of angular positions relative to said support.

References Cited in the file of this patent
UNITED STATES PATENTS 2,575,707    Gilliland et al.    Nov. 20, 1951